(12) United States Patent
Deur et al.

(10) Patent No.: US 7,451,034 B2
(45) Date of Patent: Nov. 11, 2008

(54) TRACTION CONTROL USING DYNAMIC TIRE FRICTION POTENTIAL

(75) Inventors: Josko Deur, Zagreb (HR); Jahan Asgari, Dearborn, MI (US); Davor Hrovat, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 484 days.

(21) Appl. No.: 11/373,076

(22) Filed: Mar. 10, 2006

(65) Prior Publication Data

US 2007/0213912 A1   Sep. 13, 2007

(51) Int. Cl.
*B60K 28/16* (2006.01)

(52) U.S. Cl. .......................................... 701/82; 73/146
(58) Field of Classification Search .................... 701/82, 701/80, 70, 72, 90; 73/146, 146.5; 180/408, 180/410; 303/146, 148
See application file for complete search history.

(56) References Cited

U.S. PATENT DOCUMENTS

| | | | |
|---|---|---|---|
| 4,701,682 A | 10/1987 | Hirotsu et al. | |
| 5,287,280 A | 2/1994 | Yamamoto et al. | |
| 5,508,924 A | 4/1996 | Yamashita | |
| 6,434,469 B1 | 8/2002 | Shimizu et al. | |
| 2004/0128044 A1 | 7/2004 | Hac | |
| 2004/0138797 A1 | 7/2004 | Yao et al. | |
| 2005/0234628 A1* | 10/2005 | Luders et al. | 701/80 |
| 2006/0025895 A1* | 2/2006 | Jansson | 701/1 |
| 2006/0201240 A1* | 9/2006 | Morinaga | 73/146 |

* cited by examiner

*Primary Examiner*—Dalena Tran
(74) *Attorney, Agent, or Firm*—David Kelly; MacMillan Sobanski & Todd, LLC (57) ABSTRACT

A method for controlling slip of a driven wheel on low friction surfaces includes determining the current magnitude of static tire friction potential, current magnitude of maximum dynamic tire friction potential, and magnitude of tire torque demanded by an operator of the vehicle. A lower magnitude of commanded tire force is set less than the estimated current magnitude of static tire friction potential. The magnitude of demanded wheel torque and the estimated current magnitude of maximum dynamic tire friction potential are used to set an upper magnitude of commanded tire force. The magnitude of commanded tire force is changed in a sequence of saw-tooth pulses, each pulse including an increasing ramp of tire force from the lower commanded tire force to the upper commanded tire force, the ramp having a predetermined slope, and a step that reduces the magnitude of commanded tire force between each pulse to the lower commanded tire force. An adaptation mechanism is used to adjust the saw-tooth signal parameters with respect to road condition changes.

21 Claims, 8 Drawing Sheets

TRACTION CONTROL USING DYNAMIC TIRE FRICTION POTENTIAL

BACKGROUND OF THE INVENTION

The present invention relates generally to a control method and system for improving traction of a driven wheel of a motor vehicle operating on an icy or snow surface.

Winter test data show that the maximum value of longitudinal tire force response during a wide-open-throttle tip-in transient on ice is significantly larger than the force predicted by the tire static curve, indicating that there is significant tire friction potential that is not covered by the tire static curve. Dynamic tire friction potential (DTFP) may be used to design an advanced traction control or antilock brake system (ABS) that provides improved performance when compared with the traditional traction control systems based on the static tire curve.

It has been hypothesized in that dynamic tire friction potential may be used to design advanced traction control systems with significantly improved performance when compared with the traditional traction control systems based on the static tire curve. Since the maximum dynamic friction potential occurs at high rates of applied force, of approximately 10000 N/s, implementation of the advanced traction control system would require very fast and precise generation of the wheel torque.

The peak value of the static tire force that can be reached on an ice surface is typically about 700 N. Experiments have shown that the tire force can be increased up to 2000 N, if a high rate of change of the wheel torque is applied for a vehicle starting from standstill. This finding has led to the development of a traction control strategy that is based on generation of consecutive sequences of high-rate linear rise of applied torque. The strategy can be applied in modern electrical or hybrid electrical vehicles, particularly in those equipped with in-wheel electrical motors.

SUMMARY OF THE INVENTION

A method according to this invention for controlling slip of a driven wheel of a motor vehicle includes determining the current magnitude of static tire friction potential, current magnitude of maximum dynamic tire friction potential, and magnitude of wheel torque demanded by an operator of the vehicle. A lower magnitude of commanded wheel force is set slightly below the current magnitude of static wheel friction potential. The magnitude of demanded wheel torque and the current magnitude of maximum dynamic tire friction potential are used to set an upper magnitude of commanded wheel torque. The magnitude of commanded wheel torque is changed such that wheel torque varies in a sequence of saw-tooth pulses, each pulse including an increasing ramp of wheel force from the lower commanded wheel force to the upper commanded wheel force, the ramp having a predetermined slope, and a step that reduces the magnitude of commanded wheel force between each pulse to the lower commanded wheel force.

The applied wheel torque has a saw-tooth form consisting of the interval of linear torque rise, which is followed by abrupt torque resetting to a value less and close to the maximum static force. This signal has a frequency in the approximate range from 10 to 20 Hz, and is applied in the low-slip tire region (adhesion region). The linear torque rise is reset when the applied wheel force, which is applied wheel torque divided by the effective tire radius, reaches the maximum dynamic friction potential, or if the wheel slip or wheel acceleration exceeds a predetermined threshold. Using the condition based on wheel acceleration means that precise information regarding the wheel slip (i.e. the vehicle speed) is not necessarily required, so that the strategy can be applied to a four-wheel-drive vehicle. If the wheel starts to spin despite the above conditions, a proportional+integral (PI) slip controller is used to abruptly reduce the slip to desired low values. The saw-tooth signal magnitude is adjusted with respect to wheel torque demanded from the driver and current value of maximum dynamic tire friction potential. An adaptation mechanism is used to adapt the saw-tooth signal parameters with respect to road conditions changes. Since the dynamic tire friction potential increases if the vehicle dwells at the road for several seconds, the strategy includes a stop-and-go intervention which helps to increase low-speed traction performance (e.g. climbing over an icy hill).

As an extension to the above, it is also proposed to use the torsional vibration mode that is inherent to the tire and hub system. This vibration mode is typically in the range between 20-40 Hz. By appropriately timing the torque oscillation pulses from an electromotor or similar device, it is possible to replace the saw tooth signal. One possible advantage of such an approach is that less energy will be needed, since the natural frequency or resonance will be used. Although the invention is applicable to traction control, it also applies to antilock brake systems, and possibly to dynamic stability control where similar approaches will be used for lateral force generation.

The benefits of the proposed TCS may be significant for very low vehicle speeds only, since the dynamic tire friction potential reduces at higher speeds. Nevertheless, the traction control strategy can be applied to the following important applications. The proposed TCS would significantly increase the traction force when climbing over an icy or snowy hill at low speeds. A steep, icy hill that could not be overcome by a conventional TCS could be overcome by applying the TCS of this invention. Test data show a significant DTFP may exist for snow surfaces as well. Therefore, a TCS according to this invention can be beneficial toward starting a vehicle in deep snow. In addition, it is anticipated that 10-20 percent traction performance gain can be reached for vehicle speeds up to 10 km/h and even more, provided that a higher rate of applied force is used. The 10-20 percent performance gain can have significant practical meaning for critical ABS braking maneuvers and critical vehicle dynamics control maneuvers, when considering lateral force increase through saw-tooth generation of active-steering torque.

The method is particularly effective for climbing a steep hill, where a stop-and-go vehicle motion is used to increase the dynamic tire friction potential and climb the hill.

DESCRIPTION OF THE DRAWINGS

These and other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
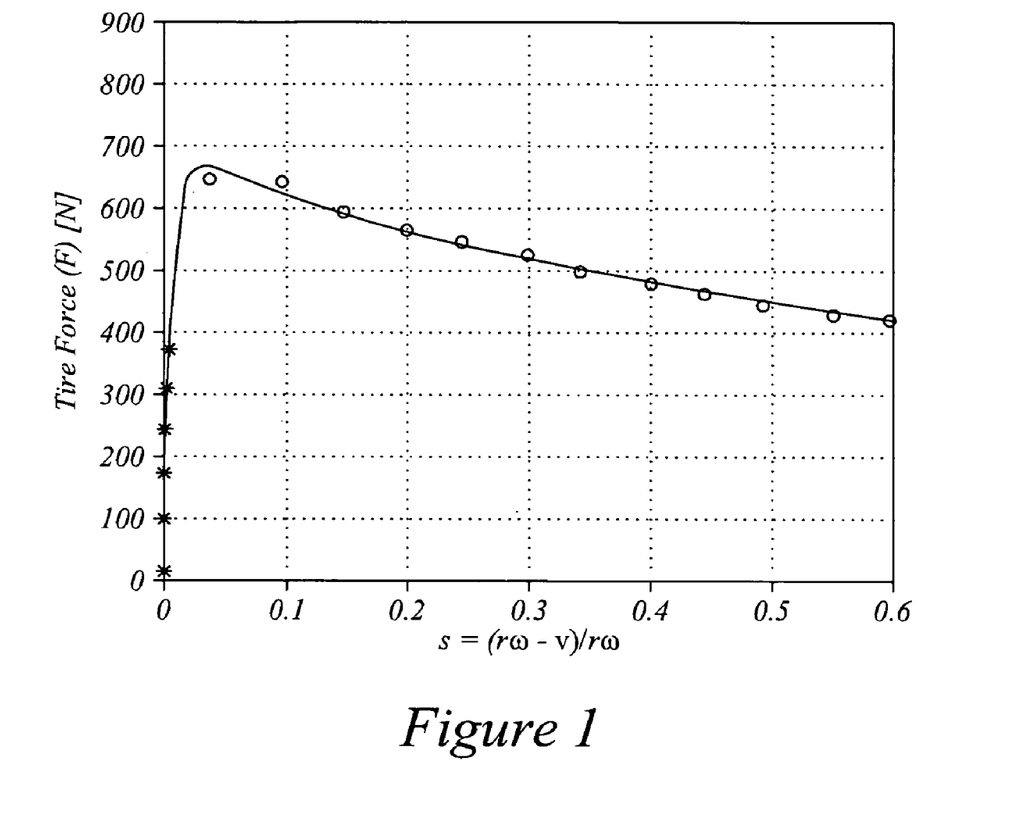
FIG. 1 is graph of static tire force vs. wheel slip for an ice surface.
Figure 2:
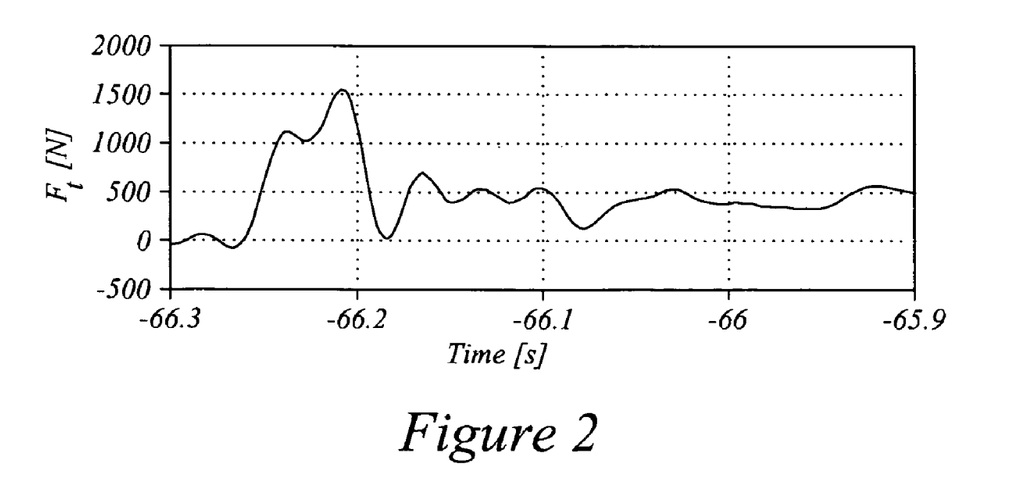
FIG. 2 is graph of the transient response of tire force vs. time during an abrupt tip-in on ice from standstill.

According to the tire static friction curve for ice surface shown in FIG. 1, the maximum static tire force F [N] is about 650 N and occurs when wheel slip (s) is approximately three percent. But the maximum reconstructed tire force $F_t$ [N] for an abrupt throttle tip-in transient from zero vehicle speed reaches the value of 1500 N as shown in FIG. 2. These data point to a dynamic tire friction potential, which is 130% higher than the maximum static friction potential. This results in better traction, i.e. in abrupt change of vehicle speed or acceleration during the tip-in interval. As the initial vehicle speed increases, the dynamic friction potential reduces, and is equal to 850-1000 N for initial vehicle speeds larger than 2 km/h. The zero-speed dynamic potential increases by approximately 30%, if the tire dwells at standstill for several seconds before the abrupt transient is executed.

Figure 3:
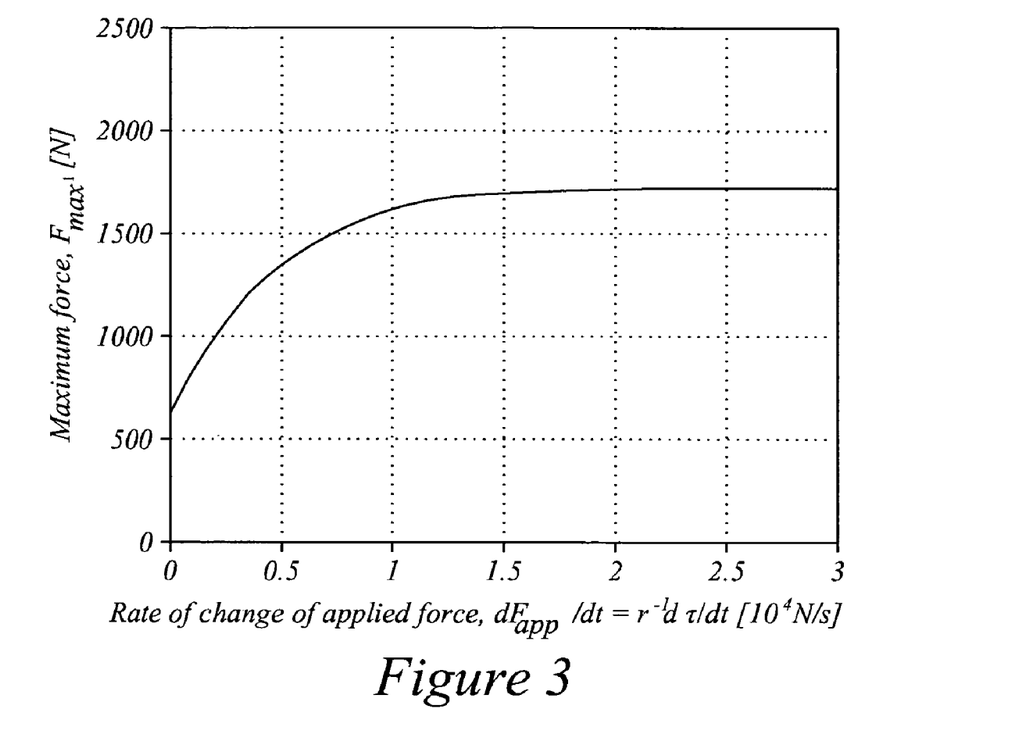
FIG. 3 is a graph that shows the variation of dynamic tire friction potential with time rate of change of applied wheel force for zero initial vehicle speed.

FIG. 3 shows the dependence of dynamic friction potential on the rate of change of applied force, where the applied force $F_{app}$ is equal to the applied wheel torque $\tau$ divided by the effective tire radius r, and where the initial vehicle speed was zero. The graph of FIG. 3 is an exponential curve, which comes close to the saturation level at the applied force rate of approximately 10000 N/s.

Figure 4:
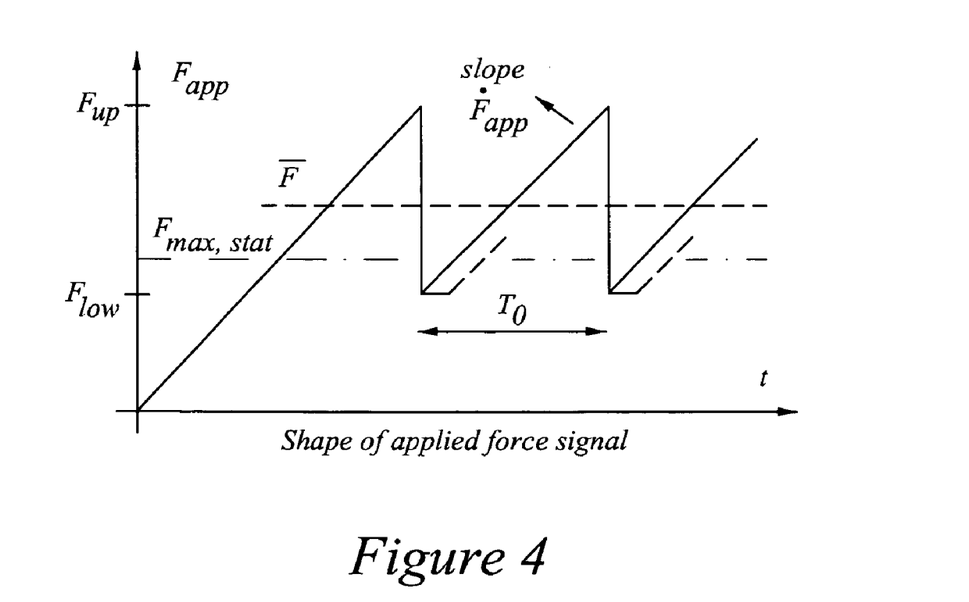
FIG. 4 is a graph of a saw-tooth applied wheel force signal vs. time.

The maximum dynamic friction potential is reached if the applied force $F_{app}=\tau/r$ is increased approximately linearly on a ramp. As shown in FIG. 3, preferably the time rate of change of applied force, $\dot{F}_{app}$, should be in the range from 10000 to 20000 N/s, in order to reach the maximum dynamic friction potential with a minimum actuator energy. When the applied force reaches the maximum dynamic friction potential $F_{max}$, i.e. immediately before the wheel starts to spin, the applied force is reset to a value between 0 and maximum static force $F_{max,stat}$, and again increased linearly. This results in the saw-tooth form of the applied force signal, which is shown in FIG. 4. As an alternative, the applied force $F_{app}$ may be kept at the value $F_{low}$, for a relatively short time to allow a possibility of tire "relaxation" shown as the dashed bold line in FIG. 4.

The critical point of the simple control concept in FIG. 4 relates to resetting the applied force to the value $F_{low}$. This should be done when the applied force reaches the predefined upper level $F_{up}$, which is less than and close to the maximum dynamic friction potential ($F_{up} \approx F_{max}$), or when the wheel acceleration or the wheel slip exceeds a threshold value to avoid wheel spinning due to inaccurate or unreliable $F_{max}$ values. The choice of wheel acceleration signal should generally be preferred, because it does not require the vehicle speed measurement and can be applied to a 4WD vehicle.

If the wheel starts to spin despite the above conditions on applied force and wheel acceleration, a slip controller can be used to reduce wheel slip to a low magnitude.

Since the maximum dynamic friction potential does not depend on the initial value of tire force, the force $F_{low}$ in FIG. 4 should be chosen close to the maximum static force $F_{max,stat}$, to provide higher average tire force $\bar{F}$, i.e., better traction performance.

Since the control concept illustrated in FIG. 4 is intended to keep the tire in the low-slip (adhesion) region at all times, the tire force response F should be close to the applied force $F_{app}$, with some relatively small delay and possible overshoot and some oscillations caused by the tire sidewall and tread dynamics.

In the "idealized" case $F=F_{app}$, the tire force mean value $\bar{F}$ is:

$$\bar{F} = \frac{F_{low} + F_{up}}{2} \qquad (1)$$

The index of traction performance improvement with respect to idealized traditional traction control system characterized by $F=F_{max,stat}$ is $$i = \left(\frac{\bar{F}}{F_{max,stat}} - 1\right) \cdot 100\% = \left(\frac{F_{low} + F_{up}}{2F_{max,stat}} - 1\right) \cdot 100\% \qquad (2)$$

The period of the saw-tooth signal in FIG. 4 is $$T_0 = \frac{F_{up} - F_{low}}{\dot{F}_{app}} \qquad (3)$$

If $F_{up} \approx F_{max} \approx 1700$ N and $F_{low}=500$ N, then $\bar{F}=1100$ N, and the theoretical traction performance improvement is $i \approx 70\%$ (for $F_{max,stat}=650$ N, FIG. 1). This percentage will certainly be lower in the real case due to some practical constraints such as tire force drops around $F_{up}$ and $F_{low}$ due to tire dynamics, possible need for the relaxation period around $F_{low}$, lower dynamic friction potential for non-zero speeds, and similar factors.

Inserting $F_{up} \approx F_{max} \approx 1700$ N and $F_{low}=500$ N in Eq. (3), together with $\dot{F}_{app}=10000$ N/s, yields the period of the applied force saw-tooth signal: $T_0=120$ ms, i.e. the frequency is 8.3 Hz. When $\dot{F}_{app}=20000$ N/s, this interval is halved to $T_0=60$ ms. The saw-tooth signal of FIG. 4 with the period of 50-100 ms is difficult to realize in a conventional vehicle with an internal combustion engine, but it can be easily implemented in an electrical vehicle, for which the torque control bandwidth is typically higher than 40 Hz.

Figure 5:
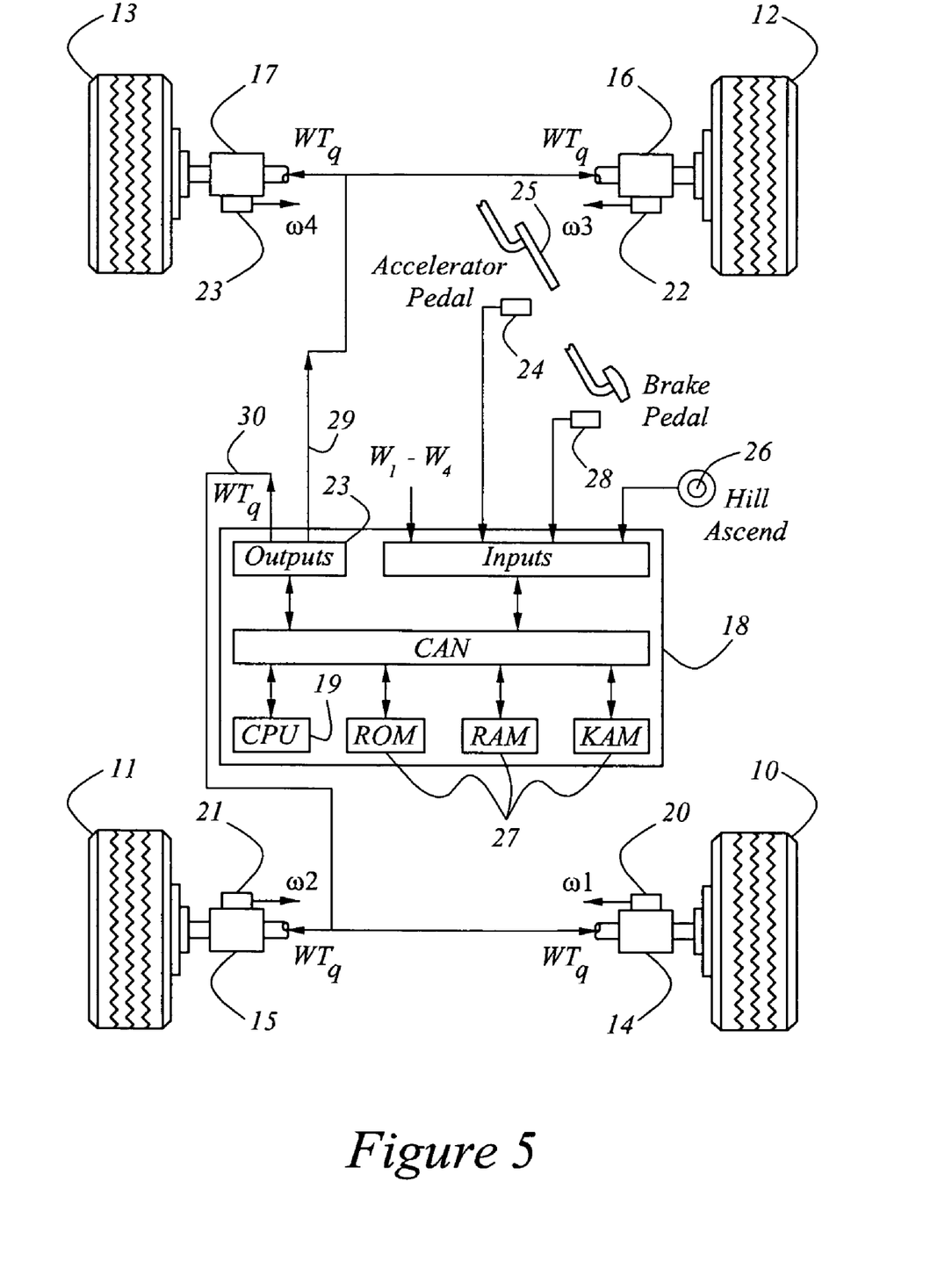
FIG. 5 is a top view of a motor vehicle driveline that includes motor driven wheels and an electronic controller for a traction control system.

Referring now to FIG. 5, a powertrain of a motor vehicle to which the present invention can be applied includes front and rear wheels 10-13; electric motors 14-17, each motor driveably connected to a respective wheel; a source of electric power, such as an electric storage battery; wheel speed sensors 20-23 for producing signals ($\omega 1$-$\omega 4$) representing the speed of the respective wheel. An electronic controller includes a central processing unit CPU communicating with the speed sensors, power source, and motors, and electronic memory containing control algorithms stored there in coded form readable by the CPU. An accelerator pedal sensor, which produces a signal representing the desired wheel torque, is controlled by the vehicle operator and communicates with the controller. A brake pedal sensor, controlled by the vehicle operator, communicates with the controller. A wheel braking system produces a signal representing the magnitude of a desired wheel braking torque.

Figure 6A:
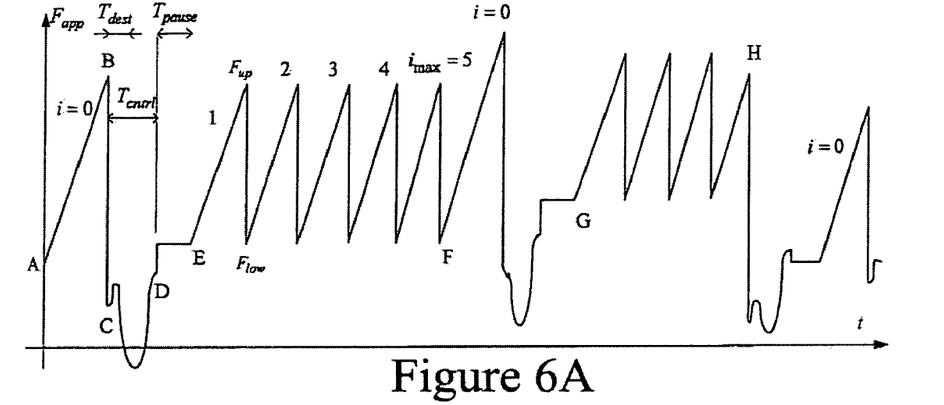
FIG. 6 is a graph illustrating wheel responses to the control signals produced by a traction control system according to this invention.
Figure 6B:
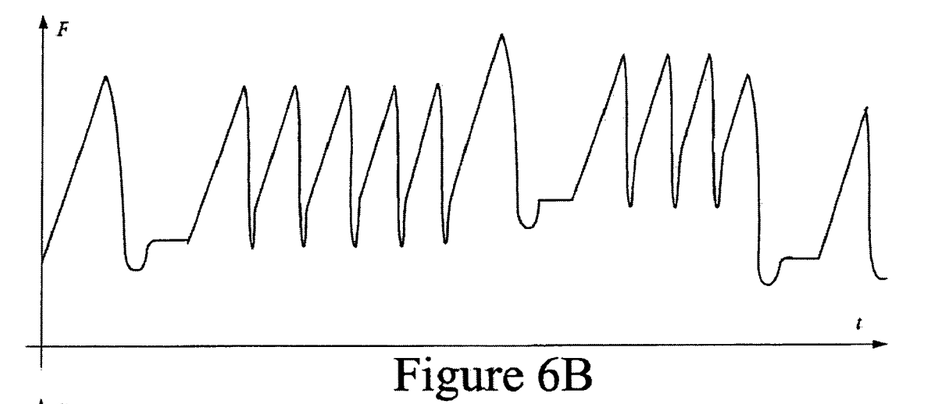
Figure 6C:
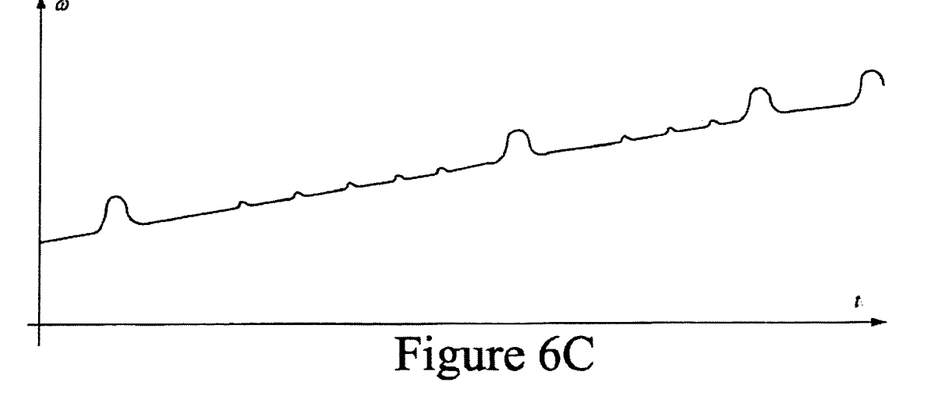

FIGS. 6A, 6B and 6C show typical responses of one of the driven wheels 10-13 to traction control according to the present invention, but they do not illustrate high-frequency oscillations of the tire force signal F and wheel speed signal $\omega$.

Figure 7:
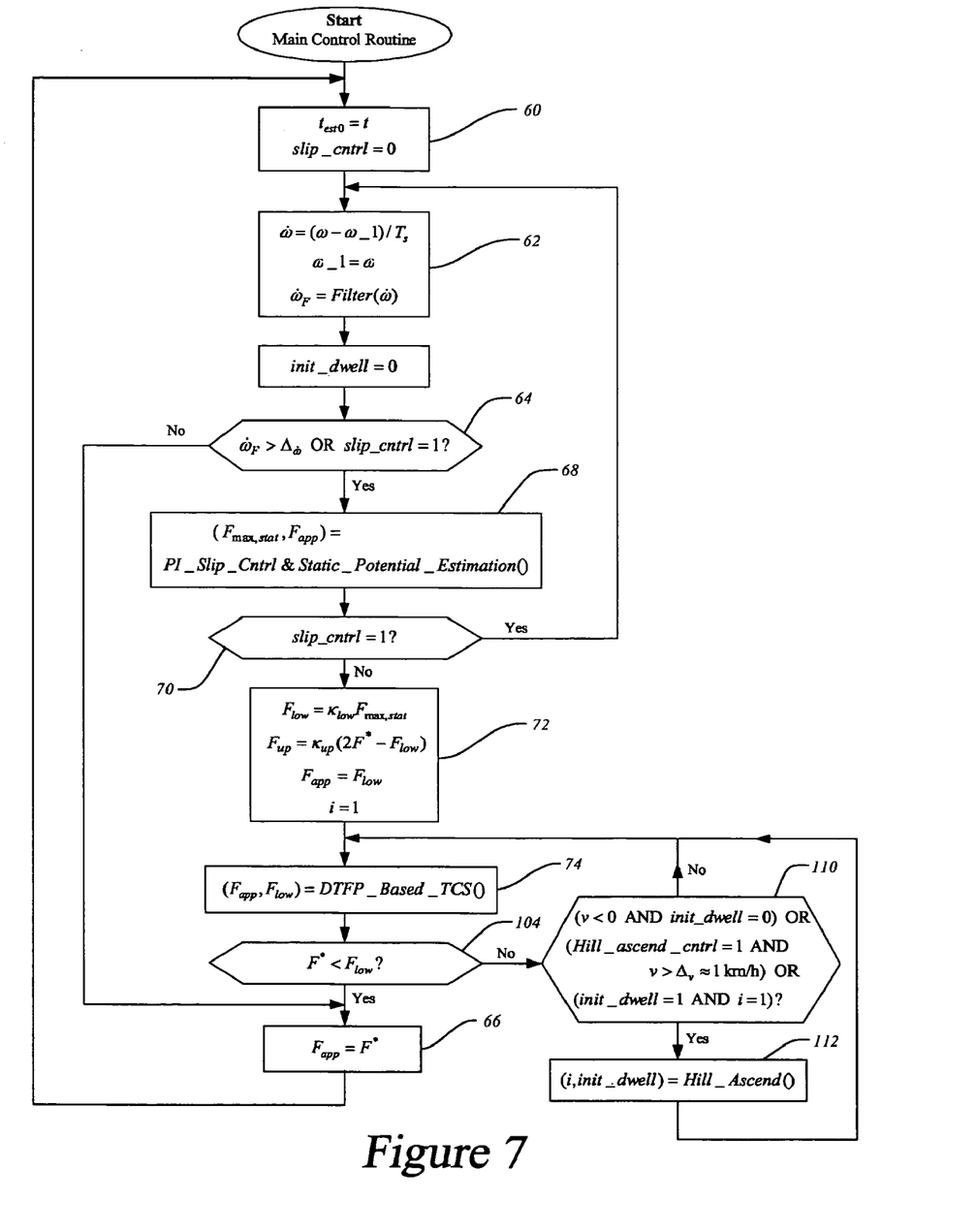
FIG. 7 is a flow diagram of control logic for a main control routine.

Referring now to the flowchart of the main control routine shown in FIG. 7, which initializes slip_cntrl=0 and sets $t_{est0}=t$ at step 60. During each sampling instant $t_k=kT_s$, k=0, 1, 2, ..., the wheel speed signal $\omega$ is differentiated at 62 to obtain a wheel acceleration signal $\dot\omega$. The wheel acceleration is filtered by using a low-pass and/or notch filter to attenuate the oscillatory modes due to tire sidewall and tread compliance. The filtered acceleration signal $\dot\omega_F$ is compared at 64 with a predetermined threshold $\Delta_\omega$ to determine if the wheel is spinning, and the slip_cntrl flag is compared with 1 to check if the wheel slip control is already active. If the test at 64 is false, indicating that wheel spinning is not occurring, at 66 the driver's wheel torque command F* is set equal to the applied force to the wheel ($F_{app}=F^*$), and the traction control system is not used.

Figure 10:
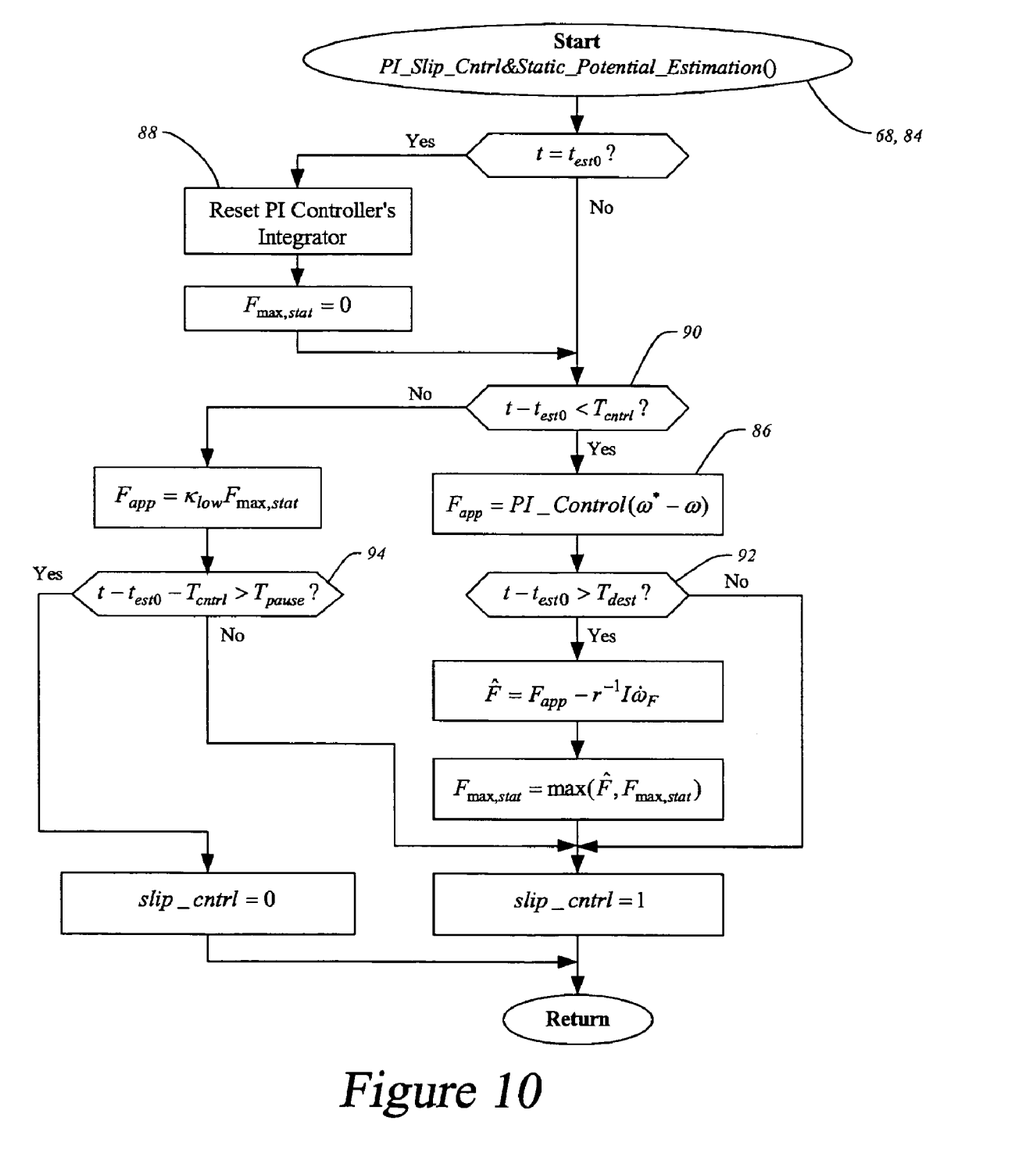
FIG. 10 is a flow diagram of control logic for determining static tire friction potential and suppressing high slips by PI control.

If wheel spinning does occur at 64, the slip control algorithm shown in FIG. 10 is activated at 68 in order to suppress the wheel slip excursion, i.e. to bring the wheel speed back to a previous value that approximately corresponds to the vehicle speed divided by the effective tire radius. The slip control algorithm also comprises a tire friction estimation algorithm, which determines the static tire friction potential $F_{max,stat}$ i.e. the maximum value of tire static curve. Applying an efficient wheel acceleration filtering algorithm makes the spinning detection fast and reliable. In the case when there are non-driven wheels with measurable speed (e.g. 2WD vehicles equipped with ABS), the driven wheel spinning can be effectively detected based on the difference of driven wheel speed and non-driven wheel speed (slip speed larger than a predetermined threshold: $\omega - 107_{nd} > \Delta_{107}$) instead of using the condition based on the wheel acceleration.

Figure 9:
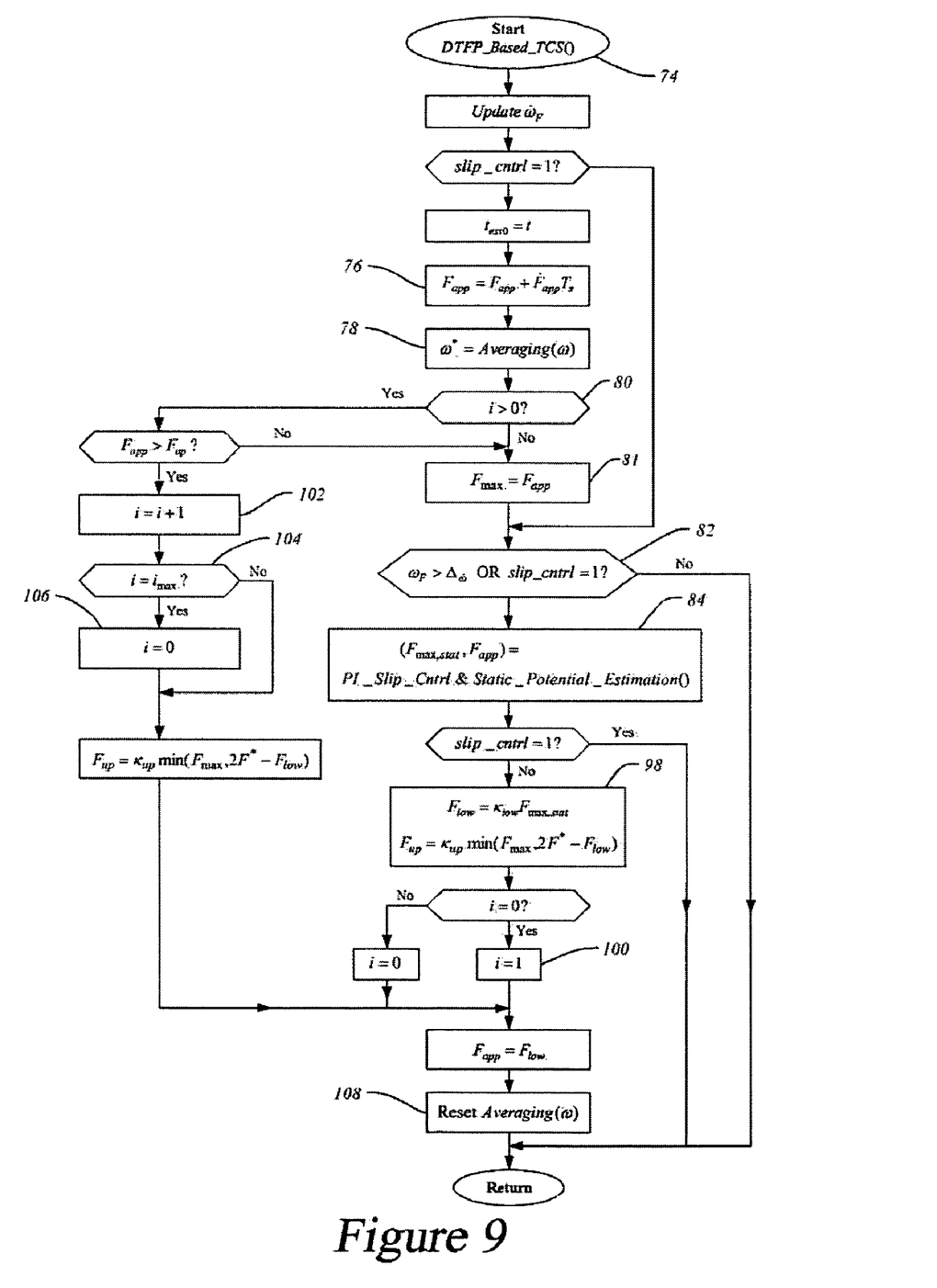
FIG. 9 is a flow diagram of control logic of a core traction control strategy based on dynamic tire friction potential.

After the slip control routine of FIG. 10 is completed, slip_cntrl=1 becomes false at step 70 in FIG. 7, and the DTFP-based TCS of FIG. 9 is ready to be initialized at 72. The lower force $F_{low}$ of the saw-tooth signal of FIG. 6 is set to a value close, but lower than the estimated maximum static tire friction potential $F_{max,stat}$ ($\kappa_{low} <\approx 1$, e.g. $\kappa_{low}=0.85$). The upper force $F_{up}$ of the saw-tooth signal is calculated by equating the commanded force F* and the average dynamic force $\bar F=0.5(F_{low}+F_{up})$, i.e. $F_{up}=\kappa_{up}(2F^*-F_{low})$, where $\kappa_{up}<\approx 1$ (e.g. $\kappa_{up}=0.9$). The applied force $F_{app}$ (i.e. an output of controller 18 in FIG. 5) is reset to the lower force $F_{low}$, and the TCS core algorithm of FIG. 9 based on saw-tooth applied force signal is ready to be executed beginning at 74.

The TCS core algorithm updates the applied force $F_{app}$ by adding at 76 the value $\dot F_{app}T_s$ ($T_s$ is the sampling time) to the rate $\dot F_{app}$ in order to generate the force ramp. It then reads the wheel speed $\omega$ to calculate at 78 its average value $\omega^*$ during a single period of saw-tooth signal. This average value relates to the vehicle speed divided by the tire radius. Note that the averaging process suppresses the influence of wheel speed oscillations due to tire compliance, and that the effect of vehicle speed increase during the saw-tooth interval is negligible due to the small saw-tooth interval (typically 50 ms). Note also that this averaging step is not needed if the non-driven wheel speed signal $\omega_{nd}$ is available because $\omega^*$ is simply set to $\omega_{nd}$ at the instant immediately before wheel spinning occurs.

The remaining part of the TCS core algorithm of FIG. 9 is illustrated by the response shown in FIG. 6. If the saw-tooth counter variable i is equal to zero at 80, the algorithm proceeds to the identification algorithm, which keeps ramping-up the applied force, shown as the ramp A-B in FIG. 6, until wheel spinning is detected, i.e. until the condition $\dot\omega_F > \Delta_\omega$ is satisfied at 82. The maximum dynamic tire friction potential $F_{max}$ is estimated as the applied force value at the instant of spinning detection. Alternatively, it may be set to $F_{app}$ of a few sampling steps before wheel spinning is detected to account for the delay of spinning detection. As explained above with reference to FIG. 7, when wheel spinning is detected, the PI controller of FIG. 10 is activated at 84 to return the wheel slip to low values. This is achieved by controlling the wheel speed $\omega$ to its average value before spinning $\omega^*$, i.e. the control error $\omega^* - \omega$ is fed at 86 to the PI controller of FIG. 10.

In order to provide a fast reaction of the controller in terms of overcoming the wheel inertia effect, the controller's integrator is reset at 88 to a value lower than $F_{low}$ immediately after wheel spinning detection (point C in FIG. 6A). The controller is active for a predetermined time $T_{cntrl}$, which is typically set to $2T_e$, where $T_e$ is the equivalent time constant of the closed-loop wheel speed control system. This interval is denoted in FIG. 6A as the interval C-D, and is implemented in FIG. 10 at 90 through the condition $t-t_{est0}<T_{cntrl}$.

While executing the PI control of FIG. 10, the maximum static friction potential $F_{max,stat}$ is estimated. The estimation is delayed with respect to PI controller activation for time $T_{dest}$ (shown in FIG. 6A and the condition $t-t_{est0}<T_{dest}$ at step 92 in FIG. 10) in order to leave some time needed to transit from the dynamic friction potential in Point B of FIG. 6A to the static friction potential that needs to be estimated. The estimated tire force $\hat F$ is calculated by subtracting the filtered acceleration force $Ir^{-1}\dot\omega_F$ from the applied force $F_{app}$. Note that the applied force may be filtered by using the same filter as for the wheel acceleration signal if this filter introduces a significant time delay. According to the tire static curve, the estimated tire force typically increases as the slip decreases, and then starts to decrease in the low-slip region. The maximum static friction potential is calculated as the maximum value of the estimated force.

After the PI control of FIG. 10 is completed, it may be convenient to leave some more time for the wheel to "stabilize" in the low slip region. This interval is denoted in FIG. 6A as the interval D-E, whose length is time $T_{pause}$, and is implemented in the PI control of FIG. 10 at step 94 through the condition $t-t_{est0}-T_{cntrl}>T_{pause}$. During the D-E interval, the applied force $F_{app}$ is set to a value close to and lower than the maximum static friction potential ($F_{app}=\kappa_{low} F_{max,stat}$, $\kappa_{low}<\approx 1$), in order to provide good traction without wheel spinning.

After completing the execution of the PI control and estimation algorithm of FIG. 10, the TCS core algorithm of FIG. 9 uses the estimated force parameters to determine the saw-tooth signal parameters. The lower force value $F_{low}$ is determined at 98 from the estimated maximum friction potential as $F_{app}=\kappa_{low}F_{max,stat}$, $\kappa_{low}<\approx 1$. The upper force value $F_{app}$ is set close to and less than the maximum dynamic friction potential $F_{max}$ ($F_{app}=\kappa_{up}F_{max}$; where $\kappa_{up}<\approx 1$), provided that the driver's commanded force F* is larger than the maximum average dynamic force $0.5(F_{low}+F_{max})$; otherwise, the upper force value $F_{app}$ is set in accordance to the commanded force: $F_{up}=2F^*-F_{low}$, i.e., so that the average dynamic force is equal to the commanded force. $F_{max}$ is obtained as a reached value of Fapp at 81 the moment of spinning detection at 82.

At step 100 of the identification algorithm of FIG. 9, the saw-tooth counter i is set equal to 1. Therefore, in the next sampling step, the normal TCS operating mode consisting of a sequence of saw-tooth pulses starts to be generated, as represented graphically in FIG. 6A as the interval E-F and in accordance with the steps of the left branch of FIG. 9. The upper force $F_{up}$ is continuously being adjusted with respect to the commanded force F* if the commanded force F* is lower than the maximum average dynamic force. The saw-tooth counter i is increment at 102.

When a predetermined number of saw teeth $i_{max}$ is counted out at 104, the saw tooth counter i is reset at 106 to zero, and consequently the TCS algorithm is again redirected to the identification algorithm, thereby giving the algorithm an adaptive feature. Namely, if a low-mu/high-mu transition occurs during the normal operating mode, i.e., if a transition from a surface of low friction coefficient to a high friction coefficient occurs, the algorithm learns that the static and dynamic friction potentials are increased, and reacts by increasing $F_{low}$ and $F_{up}$, and consequently the average dynamic force. For example, if $i_{max}=5$ is set at step 104, the adaptation is carried out each quarter of a second for the typical period of the saw-tooth signal, which period is 50 ms for an icy surface.

If wheel spinning occurs ($\omega_F > \Delta_\omega$ at step 82 in FIG. 9, and point H in FIG. 6A) during the normal operating mode (i>0), this means that the tire-road friction coefficient has decreased, or that there has been eventually some other cause of dynamic friction potential reduction, e.g. an increase of vehicle speed. If this happens, the algorithm is immediately redirected at step 84 to the PI slip control of FIG. 10 to reduce the wheel slip. It is then followed by the identification routine (i=0). After the identification routine ends (i=1), the algorithm is again redirected to the normal operating mode.

The core traction control algorithm of FIG. 9 is initially called from the superimposed routine of FIG. 7 with the saw-tooth counter set at step 72 to i=1. This means that the identification algorithm is initially skipped, i.e., the interval A-E in FIG. 6A is initially absent, because friction is partially estimated during the slip control algorithm called from the superimposed routine of FIG. 7. However, since this algorithm does not provide the information on maximum DTFP $F_{max}$, the upper force is initially set in the algorithm of FIG. 7 in accordance to the driver's command F*. If this command is too large, i.e., if it cannot be realized by the TCS, wheel spinning will occur again, as represented by point H in FIG. 6A, and the identification algorithm of FIG. 9 will then be executed with (i=0).

Figure 8:
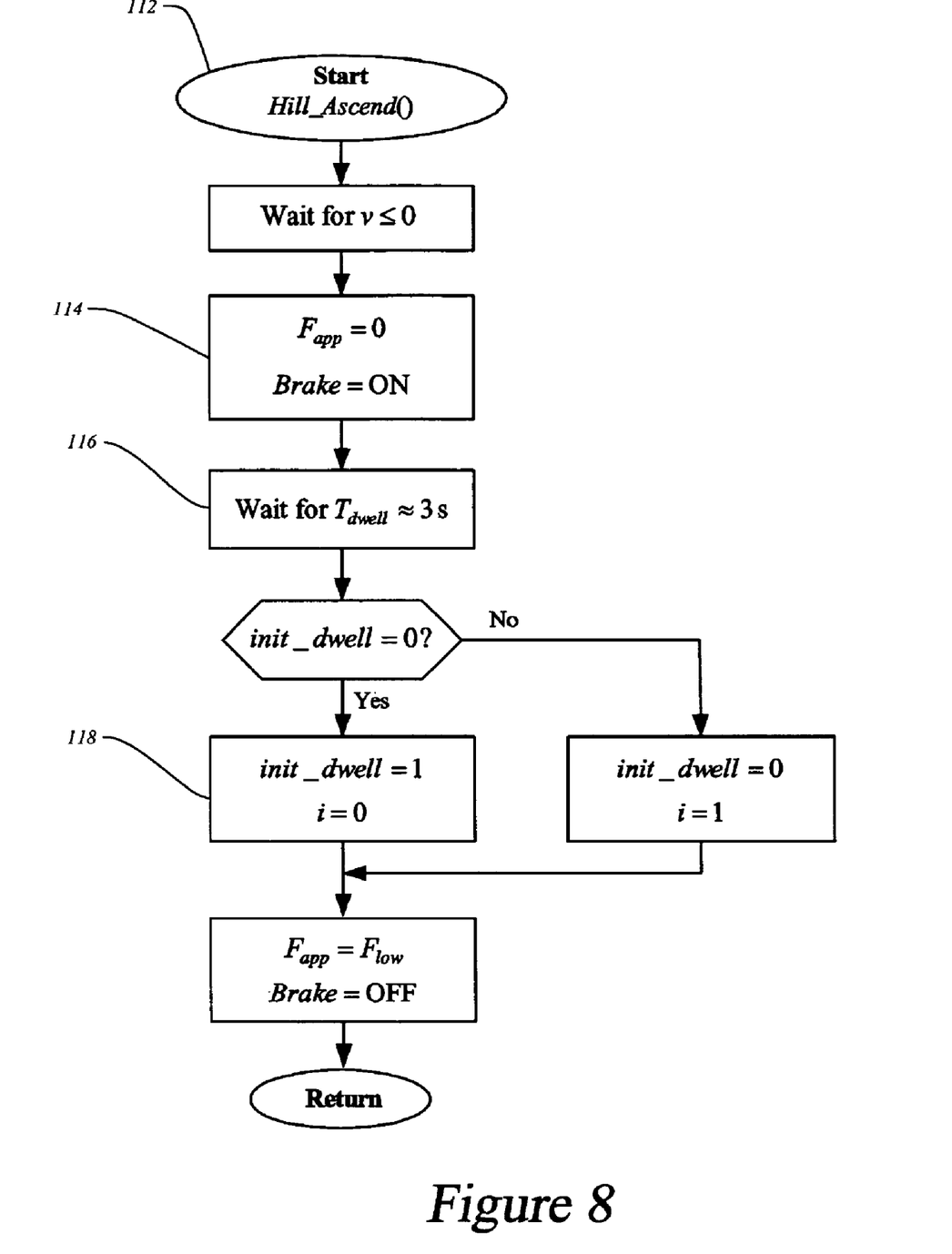
FIG. 8 is a flow diagram of hill-ascend control logic.

After each execution of the TCS core algorithm (the DTFP_based_TCS routine of FIG. 9), the main control routine of FIG. 7 checks at step 104 whether the force commanded by the driver, F*, is lower than the saw-tooth signal lower value $F_{low}$. If the test at 104 is true, the traction control is suspended, and the applied force is set at 66 to the commanded force ($F_{app}=F^*$). If the test at 104 is false, a check is made at step 110 to determine if vehicle speed is negative (i.e. of opposite sign than the applied force) or if the driver has turned on a hill-ascend button. A negative vehicle speed means that the dynamic traction force has not been high enough to climb the vehicle over the hill. If the test at step 110 is true, control passes at step 112 to the hill ascend control of FIG. 8, the vehicle is stopped at 114 by means of active wheel brakes (brake-by-wire) and remains braked on the hill for a period (dwell time $T_{dwell}$) at 116. Dwell time of a few seconds increases the dynamic friction potential on the ice surface by up to 30%. This may be enough to overcome the hill. Thus, after the dwell period expires, the identification routine is executed (i=0) at 118, and then the normal TCS mode based on the saw-tooth signal is activated (i=1). If the hill-ascend button is turned on, the vehicle stop mode is also activated at vehicle speeds greater than the predetermined speed $\Delta_v$ (typically equal to 1-1.5 km/h) due to the test at 112 of FIG. 7. The vehicle stop mode is activated because the dynamic friction potential on ice surface is significantly reduced at speeds greater than 1.5 km/h, and because the driver had requested slow driving during hill climbing. This relates to stop-and-go vehicle operation, which can significantly increase the traction performance on icy hills. Vehicle speed can again be estimated as the average value of driven wheel speed. Alternatively, vehicle speed can be estimated with reference to vehicle acceleration measurements, GPS measurements, or the non-driven wheel speed for 2WD vehicles.

There may be many variants of the TCS control described above. For example, if the average dynamic force 0.5 ($F_{low}$+ $F_{up}$) is just slightly greater than the maximum static friction potential $F_{max,stat} \approx F_{low}$, the DTFP-based TCS can be turned off to avoid relatively high NVH content related to the saw-tooth applied force variations, and a conventional traction control strategy can be used instead. The driver may turn off the DTFP-based TCS by using a special button, or turn off the traction control. Similarly, if a road condition different than ice or snow is detected, as indicated by $F_{max,stat}/F_z > 0.25$, where $F_z$ is the normal force to the wheel, the DTFP-based TCS would again be turned off. Note that the benefits of the strategy are primarily emphasized for low friction coefficient (mu) surfaces. Also, the upper value of the saw-tooth signal, $F_{up}$, may be made dependent on the vehicle speed, in order to avoid wheel spinning at higher speed due to the reduction of DTFP. The value $F_{up}$ may also be made dependent on the steering wheel angle, in order to avoid driven wheel spinning for vehicle turning. Similarly, the saw-tooth signal rate $\dot{F}_{app}$ may be made adaptive to reach a good trade-off between the NVH performance and TCS performance for different operating modes and road conditions.

In the stop-and-go strategy for climbing a hill, it may be convenient to set up the applied force to a constant saturation level, Fapp,sat~(Fup+Flow)/2, after the first high-rate linear increase of the force is applied, so that a saturated linear rise of the applied force can be used. This will decrease the NVH content without causing significant deterioration of performance.

The control strategy can easily be implemented in ABS applications. Although the strategy is described with reference to vehicle braking using an electrical motor, it can also be applied using fast hydraulic or electromagnetic actuators for the brakes. In the case of ABS applications, the responses $F_{app}$ and F in FIG. 6 would simply have the opposite sign, the control strategy would be adjusted accordingly in terms of changing signs of different variables, and the wheel speed response of FIG. 6 would have a falling trend and have peaks in the opposite direction, i.e., braking peaks. Furthermore, the strategy could be applied for vehicle dynamics control to increase the lateral force on the vehicle, provided the vehicle is equipped with a steer-by-wire system or an electrically assisted steering system. In this case, the saw-tooth signal would relate to applied steering torque, and would excite the lateral DTFP.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for controlling slip of a driven wheel of a motor vehicle comprising the steps of:
   (a) determining the current magnitude of static tire friction potential;
   (b) setting a lower magnitude of commanded tire force that is less than a current magnitude of static tire friction potential;
   (c) determining a current magnitude of maximum dynamic tire friction potential;
   (d) determining a magnitude of demanded tire torque;
   (e) using the magnitude of demanded tire torque and the current magnitude of maximum dynamic tire friction potential to set an upper magnitude of commanded tire force;
   (f) changing the magnitude of commanded tire force in a sequence of saw-tooth pulses, each pulse including a ramp of increasing magnitude of commanded tire force from the lower commanded tire force to the upper commanded tire force, the ramp having a predetermined slope, and a step in which the magnitude of commanded tire force is reduced following each ramp to the lower commanded tire force.

2. The method of claim 1, wherein step (f) further comprises:
   determining whether the demanded tire force is greater than the average of the lower commanded tire force and the current maximum dynamic tire friction potential;
   if the demanded tire force is greater than an average of the lower commanded tire force and the maximum dynamic tire friction potential, setting the upper commanded tire force equal to or slightly less than the maximum dynamic tire friction potential; and
   changing the magnitude of commanded tire force in a sequence of saw-tooth pulses, each pulse including a ramp of increasing magnitude of commanded tire force that rises with a predetermined slope from the lower commanded tire force to the upper commanded tire force, and a step in which the magnitude of commanded tire force declines following each ramp to the lower commanded tire force.

3. The method of claim 2, wherein the step of changing the magnitude of tire torque further comprises:
   producing the sequence of variable tire force saw-tooth pulses, each pulse having a linear ramp of increasing amplitude whose slope is in the range 10000-20000 N per second, an amplitude of each pulse varying from the lower commanded tire force to the upper commanded tire force.

4. The method of claim 2, wherein the step of changing the magnitude of tire torque further comprises:
   producing the sequence of variable tire force saw-tooth pulses, each pulse having a linear ramp of increasing amplitude whose slope is in the range 10000-20000 N per second, an amplitude of each pulse varying from the lower commanded tire force to the upper commanded tire force.

5. The method of claim 1, further comprising:
   determining whether the demanded tire force is greater than the average of the lower commanded tire force and the maximum dynamic tire friction potential;
   if the demanded tire force is not greater than an average of the lower commanded tire force and the maximum dynamic tire friction potential, setting an upper tire force equal to two times the current commanded tire force minus the lower commanded tire force; and
   changing the magnitude of commanded tire force in a sequence of saw-tooth pulses, each pulse including an increasing ramp of commanded tire force that increases from the lower commanded tire force to the upper commanded tire force, the ramp having a predetermined slope, and a step in which the magnitude of commanded tire force is reduced to the lower commanded tire force after each pulse.

6. The method of claim 1, further comprising:
   determining a number of tire force pulses to be produced;
   continually producing a sequence of variable tire force until the predetermined number is produced;
   redetermining the magnitude of static tire friction potential;
   redetermining the magnitude of dynamic tire friction potential; and
   repeating step (f) using the redetermined magnitudes of static tire friction force and dynamic tire friction force.

7. A system for controlling tire slip of a driven wheel of a motor vehicle comprising;
   a device for transmitting torque to the tire;
   an acceleration pedal sensor for producing a signal representing the magnitude of tire torque demanded by a vehicle operator;
   a sensor producing a signal representing rotational speed of the tire;
   a controller communicating with the torque transmitting device and acceleration pedal sensor and speed sensor, and including means for determining that tire slip is occurring, determining the magnitude of static tire friction potential, setting a lower magnitude of commanded tire force less than the static tire friction potential, repetitively issuing commands to the transmitting device causing a predetermined time rate of increase in the magnitude of commanded tire force from the lower magnitude of commanded force toward the upper commanded force, if tire slip recurs prior to reaching the upper commanded force, using the magnitude of commanded tire torque at which tire spin recurred to estimate the current magnitude of maximum dynamic tire friction potential, and reducing the magnitude of commanded tire force by means of PI control with reset integrator action to stop tire spin.

8. The system of claim 7 wherein the controller estimates the current magnitude of maximum dynamic tire friction potential as being equal to the magnitude of commanded tire force at which tire spin recurs.

9. The system of claim 7 wherein the controller further includes means for:
   estimating the current magnitude of static tire friction potential;
   setting the lower commanded tire force less than the current magnitude of static tire friction potential;
   determining the demanded tire force;
   determining whether the demanded tire force is greater than the average of the lower commanded tire force and the maximum dynamic tire friction potential;
   if the demanded tire force is greater than the average of the lower commanded tire force and the maximum dynamic tire friction potential, setting an upper tire force equal to or slightly less than the maximum dynamic tire friction force; and
   producing a sequence of variable tire force command signals to the torque transmitting device in the form of saw-tooth pulses that vary from the lower commanded tire force to the upper commanded tire force.

10. The system of claim 9 wherein the controller further includes means for:
producing a sequence of variable tire force command signals to the torque transmitting device in the form of saw-tooth pulses, having a ramp whose slope is in the range 10000-20000 N per second, an amplitude of each pulse varying from the lower commanded tire force to the upper commanded tire force; and
decreasing the magnitude of the commanded tire force in a step after the commanded tire force reaches the magnitude of the upper commanded tire force.

11. The system of claim 7 wherein the controller further includes means for:
estimating the magnitude of static tire friction potential;
setting the lower commanded tire force less than the current magnitude of static tire friction potential;
determining whether the demanded tire force is greater than the average of the lower commanded tire force and the maximum dynamic tire friction potential;
if the demanded tire force is not greater than the average of the lower commanded tire force and the maximum dynamic tire friction potential, setting an upper tire force equal to two times the current commanded tire force minus the lower commanded tire force; and
producing a sequence of variable tire force command signals to the torque transmitting device in the form of saw-tooth pulses that vary from the lower commanded tire force to the upper commanded tire force.

12. The system of claim 11 wherein the controller further includes means for:
producing a sequence of variable tire force command signals to the torque transmitting device in the form of saw-tooth pulses, having a ramp whose slope is in the range 10000-20000 N per second, an amplitude of each pulse varying from the lower commanded tire force to the upper commanded tire force; and
decreasing the magnitude of the commanded tire force in a step after the commanded tire force reaches the magnitude of the upper commanded tire force.

13. A method for controlling slip of a driven tire of a motor vehicle comprising the steps of:
(a) repetitively monitoring tire slip and tire acceleration;
(b) if tire spin occurs, using a PI controller with reset integrator action to until tire slip stops;
(c) setting a static tire friction potential equal to maximum value of reconstructed tire force during the interval of PI slip control;
(d) setting a lower magnitude of tire force $F_{low}$ than the static tire friction potential,
(e) determining a magnitude of tire force demanded by an operator of the vehicle $F^*$;
(f) setting an upper magnitude of commanded tire force $F_{up}$ equal to or slightly lower than minimum between dynamic friction potential $F_{max}$ and two times the demanded tire force minus the lower magnitude of commanded tire force($2 F^*-F_{low}$);
(e) increasing the magnitude of commanded tire force such that a tire force varies in a sequence of saw-tooth pulses that includes a linear ramp of increasing magnitude of tire force from the lower tire force to the tire force at which tire spin starts, and a step in which the magnitude of tire force is reduced following the ramp.

14. The method of claim 13, wherein the ramp has a time rate of increase in the range 10000-20000 N per second.

15. The method of claim 13, further comprising:
determining a magnitude of dynamic tire friction potential equal to the commanded tire force at which tire slip recurs or a few sampling steps before tire slip recurs;
estimating the static tire friction potential;
resetting the lower magnitude of commanded tire force less than the static tire friction potential;
determining a magnitude of tire force demanded by an operator of the vehicle $F^*$;
if the demanded tire force is greater than an average of the lower commanded tire force and the maximum dynamic tire friction potential, setting the upper tire force equal to or slightly less than the maximum dynamic tire friction potential; and
changing the magnitude of commanded tire force in a sequence of saw-tooth pulses, each pulse including a ramp of increasing magnitude of commanded tire force that rises during a predetermined period from the lower tire force to the upper tire force, and a step in which the magnitude of commanded tire force declines following each ramp to the lower commanded tire force.

16. The method of claim 15, wherein the step of changing the magnitude of tire torque further comprises:
producing the sequence of variable commanded tire force saw-tooth pulses, each pulse having a linear ramp of increasing amplitude whose slope is in the range 10000-20000 N per second, an amplitude of each pulse varying from the lower commanded tire force to the upper commanded tire force.

17. The method of claim 13, further comprising:
determining a magnitude of dynamic tire friction potential equal to the commanded tire force at which tire slip recurs or a few sampling steps before tire slip recurs;
estimating the static tire friction potential;
resetting the lower magnitude of commanded tire force less than the static tire friction potential;
determining a magnitude of tire force demanded by an operator of the vehicle $F^*$;
if the demanded tire force is not greater than an average of the lower commanded tire force and the maximum dynamic tire friction potential, setting an upper tire force equal to two times the current commanded tire force minus the lower commanded tire force; and
changing the magnitude of commanded tire force in a sequence of saw-tooth pulses, each pulse including an increasing ramp of commanded tire force that increases from the lower commanded tire force to the upper commanded tire force, the ramp having a predetermined slope, and a step in which the magnitude of commanded tire force is reduced to the lower commanded tire force after each pulse.

18. The method of claim 17 wherein the step of changing the magnitude of commanded tire force further comprises:
producing the sequence of variable tire force saw-tooth pulses, each pulse having a linear ramp of increasing amplitude whose slope is in the range 10000- 20000 N per second, an amplitude of each pulse varying from the lower commanded tire force to the upper commanded tire force.

19. The method of claim 13, further comprising:
determining a number of tire force pulses to be produced;
continually producing a sequence of tire force pulses until the predetermined number of pulses is produced.

20. The method of claim 13, further comprising:
if vehicle speed is negative or has an opposite direction to the direction of the applied tire force, applying wheel brakes to stop the vehicle for a predetermined period of typically several seconds in order to increase the dynamic tire friction potential, and applying saw-tooth signal of commanded tire force again.

21. The method of claim 13, further comprising:
if vehicle speed is negative or has an opposite direction to the direction of the applied tire force, applying wheel brakes to stop the vehicle for a predetermined period of typically several seconds in order to increase the dynamic tire friction potential, and applying a saturated linear form of commanded tire force having a magnitude substantially equal to an average of $F_{up}$ and $F_{low}$.

* * * * *